United States Patent
Briesen et al.

(10) Patent No.: US 6,603,647 B2
(45) Date of Patent: Aug. 5, 2003

(54) METHOD FOR CONTROLLING FREEWHEELING PATHS IN A MATRIX CONVERTER

(75) Inventors: Christian Briesen, Florstadt (DE); Manfred Bruckmann, Nuremberg (DE); Marco Kaiser, Haar (DE); Hubert Schierling, Erlangen (DE); Olaf Simon, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/259,246

(22) Filed: Sep. 27, 2002

(65) Prior Publication Data

US 2003/0112640 A1 Jun. 19, 2003

Related U.S. Application Data

(63) Continuation of application No. PCT/DE01/01041, filed on Mar. 19, 2001.

(30) Foreign Application Priority Data

Mar. 31, 2000 (DE) .......................................... 10016230

(51) Int. Cl.$^7$ ................................................. H02H 3/20
(52) U.S. Cl. ......................................... 361/91.1; 363/50
(58) Field of Search ............................... 361/91.1, 111, 361/56; 363/159, 160, 163, 8, 50

(56) References Cited

U.S. PATENT DOCUMENTS 5,852,559 A * 12/1998 Li ............................... 363/163
5,949,672 A * 9/1999 Bernet ......................... 363/159
6,496,343 B2 * 12/2002 Mahlein et al. ............. 361/91.1

FOREIGN PATENT DOCUMENTS

DE 197 46 797 A1 5/1999

OTHER PUBLICATIONS

M. Ziegler et al.: Semi Natural Two Steps Commutation Strategy For Matrix Converters, in: IEEE, 1998, pp. 727–731 No month.

M. Ziegler et al.: Implementation of a Two Steps Commutated Matrix Converter, in: IEEE, 1999, pp. 175–180 No month.

R. Cittadini et al.: A Matrix Converter Switching Controller For Low Losses Operation Without Snubber Circuits, in: European Conference on Power Electronics and Applications, vol. 4, Conference 7, pp. 199–203 1997 No month.

A. Schuster: "A Matrix Converter Without Reactive Clamp Elements For an Inductionmotor Drive System", in: IEEE Specialist Conference, vol. 1, May 17, 1998.

* cited by examiner

*Primary Examiner*—Shawn Riley
(74) *Attorney, Agent, or Firm*—Henry M. Feiereisen

(57) ABSTRACT

A method for controlling positive or negative freewheeling paths of the phases of a matrix converter with nine bidirectional power switches arranged in a 3×3 switch matrix is described. Each power switch has two back-to-back series-connected semiconductor switches. Those semiconductor switches are actuated that have the most positive/negative line voltage to provide a negative/positive freewheeling path capable of carrying a negative/positive load current. The matrix converter can be immediately disconnected if an error is detected or if the matrix converter is inadvertently switched off, without damaging the matrix converter.

6 Claims, 7 Drawing Sheets

METHOD FOR CONTROLLING FREEWHEELING PATHS IN A MATRIX CONVERTER

CROSS-REFERENCES TO RELATED APPLICATIONS

This application is a continuation of prior filed copending PCT International application no. PCT/DE01/01041, filed Mar. 19, 2001.

This application claims the priority of German Patent Application, Serial No. 100 16 230.4, filed Mar. 31, 2000, pursuant to 35 U.S.C. 119(a)–(d), the subject matter of which is incorporated herein by reference.

BACKGROUND OF THE INVENTION

The present invention relates to a method for controlling positive or negative freewheeling paths of the phases of a matrix converter having nine bidirectional power switches arranged in a 3×3 switch matrix, with each power switch having two back-to-back series-connected semiconductor switches.

A matrix converter is a self-commutated direct converter which allows a rigid three-phase network to be converted to a system with a variable voltage and frequency. The arrangement of the bidirectional power switches in a 3×3 switch matrix allows one of the three output phases of the matrix converter to be electrically connected to one input phase. One phase of the matrix converter comprises an arrangement of three bidirectional power switches, which are each connected on one side to an input phase and on the other side to an output phase. An arrangement such as this is also referred to as a 3×1 switch matrix. The matrix converter does not require an intermediate circuit. The self-commutated direct converter offers the advantage that its topology means that it allows feedback, and appropriately applied control allows sinusoidal network currents to be achieved.

The bidirectional power switches in the matrix converter each have two back-to-back series-connected semiconductor switches. Insulated gate bipolar transistors (IGBTs) are preferably used as the semiconductor switches, each of which having a back-to-back parallel-connected diode. Bidirectional power switches designed in this way are preferably used for converters for low and medium power levels. Actuation of these semiconductor switches in the bidirectional power switches in each case produces a current path in a direction which is governed by the arrangement of the semiconductor switches. If both the semiconductor switches in one bidirectional power switch are actuated, then this power switch is switched on bidirectionally, and current can flow in both directions. This results in a reliable electrical connection between an input phase and an output phase of the matrix converter. If only one semiconductor switch in a bidirectional power switch is actuated, then this switch is switched on unidirectionally, and an electrical connection is produced only for a preferred current direction between an input phase and an output phase of the matrix converter.

Optimum actuation allows sinusoidal network current consumption. In order to avoid loading the feeding network with pulse-frequency harmonics, the matrix converter also requires an input filter, comprising LC elements. Owing to the large number of semiconductor switches, the actuation process is very complex.

When the matrix converter is switched off, it is necessary to ensure that the output current tends to zero before all the switches can be switched off. It is advantageous for the current to be reduced to zero by means of a natural diode function, rather than by current regulation. This can be achieved by means of freewheeling in the matrix converter. Furthermore it is desirable for the matrix converter to be switched to a safe state at any time in the event of a fault, for example in the event of an overcurrent. This means that it is desirable to be able to change from commutation control for normal operation to freewheeling control.

The object of the commutation logic for one phase of the matrix converter is to actuate the six semiconductor switches of the three bidirectional power switches in the respective output phases of the matrix converter in such a way that the switching commands for the triggering equipment are implemented correctly, allowing reliable operation of the converter. The control logic must in all circumstances prevent a short circuit of the supply voltages on the input side, or at the output, not resulting in an interruption in the load current. Otherwise, this would lead to destruction of at least one semiconductor switch as a result of an overcurrent or overvoltage.

In the case of voltage-controlled commutation logic, the phase that is intended to be commutated to and the polarity of the phase-to-phase input voltages are required. In this case, the polarity of the output current is not important, since there is always a path for both current paths both in the steady case and during commutation.

FIG. 2 shows, in the form of a graph, all the possible commutation steps. Overall, there are 22 different switching operations which can occur, depending on the commutation control. A "1" means that a semiconductor switch in a bidirectional power switch is switched on, with a "0" representing a switched-off semiconductor switch in a bidirectional power switch.

Once the matrix converter has been switched on, all the semiconductor switches in the nine bidirectional power switches are switched off. If it is intended to change to a steady state, a change must be made from the center point "OFF" to one of the three corner points "U", "V" or "W". A change can be made from one steady state to any other steady state. Depending on the polarities of the voltages, there are three different routes to change to a new steady state. While traveling from one steady state to the next, it is therefore impossible to reverse. This "one-way only regulation" is necessary in order to avoid undefined states and reactions.

It must be possible to switch off the matrix converter at any time, even during a commutation process. To allow this to be done, there must be a route from each state to the center point "OFF" in FIG. 2. In order to avoid overvoltages and destruction of the semiconductor switches in the bidirectional power switches when switching off all the semiconductor switches, a device must be provided which allows current to continue to flow during the switching off process, dissipating the energy in the load.

This further current flow is made possible by means of a freewheeling path, which must be switched. If only one semiconductor switch is actuated in a bidirectional power switch with two back-to-back series-connected semiconductor switches, this means that the bidirectional power switch is closed unidirectionally. If its enabled current direction is in the opposite direction to the voltage which is applied to it, then this is referred to as freewheeling. If this unidirectionally closed bidirectional power switch allows a positive current flow, that is to say from the feed network to the load, then this freewheeling is referred to as positive freewheeling. If a negative current flow is allowed, then the freewheeling is referred to as negative freewheeling.

Four-stage, current-dependent commutation is known from the publication "A Matrix Converter without reactive clamp elements for an induction motor drive system", A. Schuster, PESC 98, Japan, pages 714–720. This current-dependent commutation uses the polarity of the output current as a decision variable for the switching sequence of the four semiconductor switches which are involved in the commutation process in the two bidirectional power switches. Furthermore, this publication describes a switching-off strategy for the matrix converter, which can change from specific states to the freewheeling mode, following normal operation.

This approach has the disadvantage that a certain time delay may occur before the freewheeling mode is reliably reached. It is therefore not possible to switch off the matrix converter at any time. Nevertheless, additional protective measures are thus required for each semiconductor switch in the bidirectional power switches for this time period. This publication proposes the use of varistors as the protective measure, which are connected electrically in parallel with each semiconductor switch.

A method for commutation and for switching on a free-wheeling path is known from the publication "A Matrix converter switching controller for low losses operation without snubber circuits", R. Cittadini, J. J. Huselstein, C. Glaize, EPE 97, pages 4.199 to 4.203. Depending on the voltage which is applied to the commutation group, additional switches are switched on in addition to a bidirectional switch, and allow freewheeling. These additional switches thus allow energy which is stored in the load inductance to be fed back into the network. This commutation process is a two-stage process. In this commutation process, the semiconductor switch which is oriented from the current flow direction in the voltage direction is switched off during the transitional state, while the freewheeling diode valves (with current flow oriented in the opposite direction to the voltage direction) remain switched on continuously. In this method, the voltage is subdivided into three regions. At low voltage levels, the presetting is not influenced by the commutation control, that is to say all the semiconductor switches in the commutation group are switched on, so that this briefly results in a short circuit. Since this occurs in the transitional region where the voltages are low, the short-circuit currents are very low.

This method has the disadvantage that no freewheeling paths are kept available around the zero point, so that unreliable operation may occur. An unreliable measurement in the voltage evaluation process can lead to a phase short circuit when the voltages then become higher.

A two-step commutation strategy for a matrix converter and which is voltage-oriented is known from the publication "Semi Natural two steps commutation strategy for matrix converters", M. Ziegler, W. Hofmann, PESC 98, pages 727 to 731. This control method is based on the detection of 60° intervals as they occur. An interval starts with an intersection of two input winding section voltages and ends with a subsequent intersection of two input winding section voltages. In consequence, none of the phase-to-phase voltages change their polarity within one interval. Three main states, which do not cause a short circuit between two input phases, may be found in each case as a function of specific intervals. Each main state produces a bidirectional connection between an output phase and the nominal input phase. In addition, so-called redundant unidirectional switches are closed in the main states. In the situation where one input phase is at a higher voltage than the nominal input phase, a corresponding unidirectional switch is closed in the reverse direction. In the situation where the voltage is lower, a corresponding unidirectional switch is closed in the forward direction. Four unidirectional switches are always closed, and two are open, in the main states in a converter element of a 3×3 matrix converter. A converter element in a 3×3 matrix converter comprises three bidirectional switches, which may connect each of the three input phases of the matrix converter to one output phase. The commutation of the output current from one input phase to the other can then always take place in only two steps. In the main states, each output phase is bidirectionally connected to one input phase. During the transition from one main state to the subsequent state, the bidirectional connection in a diode link to the input phase is disconnected first, with the next bidirectional state (main state) then being implemented.

In this method, it is unclear which switches can be switched off in the event of a fault, and which must be switched on. Pure freewheeling control operation is thus impossible. Furthermore, long-lasting short circuits can occur on the input voltages, if the polarity of the phase-to-phase voltages is measured incorrectly.

The method proposed in the aforementioned publication has been disclosed in DE 197 46 797.

It would therefore be desirable and advantageous to provide an improved method for controlling continuously available positive or negative freewheeling paths in a matrix converter that can be switched off without any time delay, in the event that the matrix converter has a fault or is switched off, without destroying the matrix converter. The method should also be robust with respect to measurement errors of the voltage polarity in a region around the zero point.

SUMMARY OF THE INVENTION

According to one aspect of the invention, a method is disclosed for controlling positive or negative freewheeling paths in a phase of a matrix converter having nine bidirectional power switches arranged in a 3×3 switch matrix, with each power switch associated with a matrix converter phase and having two back-to-back series-connected semiconductor switches. The method includes identifying a bidirectional power switch of a matrix converter phase having a most negative line voltage; identifying a bidirectional power switch of a matrix converter phase having a most positive line voltage; actuating the semiconductor switch of the identified bidirectional power switch having the most negative line voltage to provide a positive freewheeling path capable of carrying a positive load current, and actuating the semiconductor switch of the identified bidirectional power switch having the most positive line voltage to provide a negative freewheeling path capable of carrying a negative load current.

This results in pure freewheeling control which allows commutation control for a matrix converter to be switched off at any time without destroying the matrix converter. The separate freewheeling control means that a current path which ensures that the current flowing in a load inductance flows continuously, independently of commutation control, at all times in the matrix converter, thereby always ensuring energy feedback from the load side to the network side. The freewheeling control according to the invention switches on bidirectional power switches in the matrix converter in order to protect the matrix converter. The matrix converter can then be switched off without any time delay in the event of fault or in the event of a matrix converter being switched off, without destroying said matrix converter. There is hence no longer any need for any overvoltage protection devices, such as snubber circuits for the semiconductor switches in the bidirectional power switches, for the semiconductor switches in the bidirectional power switches of the matrix converter.

In one advantageous embodiment, in a region of a positive or negative zero crossing of a phase-to-phase input voltage, the semiconductor switches in the two bidirectional power switches which are involved at the zero crossing in each phase of the matrix converter are first selected for a negative or positive freewheeling path, and these semiconductor switches are then compared with semiconductor switches in the bidirectional power switches determined by means of a commutation method. If this comparison results in a match, the selected semiconductor switch, which is also determined as a function of the commutation, is actuated. If no match is found between semiconductor switches which are switched on as a function of freewheeling and those which are switched on as a function of commutation, then the semiconductor switches in the bidirectional power switches which are to be switched as a function of freewheeling in each matrix converter phase are actuated.

The risk of incorrect measurement results is greatest in the region around the voltage zero crossing of the phase-to-phase input voltage of the matrix converter. These incorrect voltage measurements can lead to incorrect switching operations as a function of freewheeling, so that short circuits as a function of freewheeling are possible. This advantageous method means that there is no longer any risk of short circuits even when the voltage polarities are determined in this way.

In another advantageous embodiment, when a region of a positive or negative zero crossing of a phase-to-phase input voltage of the matrix converter is reached, the previously mentioned advantageous embodiment is activated immediately, with the semiconductor switches which are actuated as a function of freewheeling and were active before this region remaining active for a predetermined time. An overlap region is thus defined, in which both methods are active. One freewheeling process is thus always switched. Once the overlap time has elapsed, the chronologically older method is deactivated.

With the method of the invention, freewheeling paths are switched on continuously during operation of the matrix converter with their functions being separated from the switched-on semiconductor switches in the bidirectional power switches in the commutation control process, thus always ensuring that power is supplied on only one path from the load side to the feeding network. In the preferred embodiment of the method according to the invention, this method is robust with respect to voltage errors, particularly at the zero crossing of the phase-to-phase input voltages.

Unnecessary switching operations can be eliminated by logically linking the switching operations which are dependent on commutation and the switching operations which are dependent on freewheeling with each other by means of an OR gate. Even switches, which have been switched on by the commutation control process, are thereby protected against being switched off by the commutation control process or by other processes. The additional switches which are dependent on freewheeling have no current-carrying function during normal operation of the matrix converter. They are switched on such that, when the matrix converter is switched off, a freewheeling path is ensured in each direction for the load current. This is necessary since suddenly switching off all the semiconductor switches in the bidirectional power switches in the matrix converter can lead to destruction of the semiconductor switches in the bidirectional power switches as a result of overvoltage. The freewheeling paths which are switched by means of the method according to the invention allow current to flow continuously between one output phase and a feeding network, with the current being driven against a higher network voltage.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
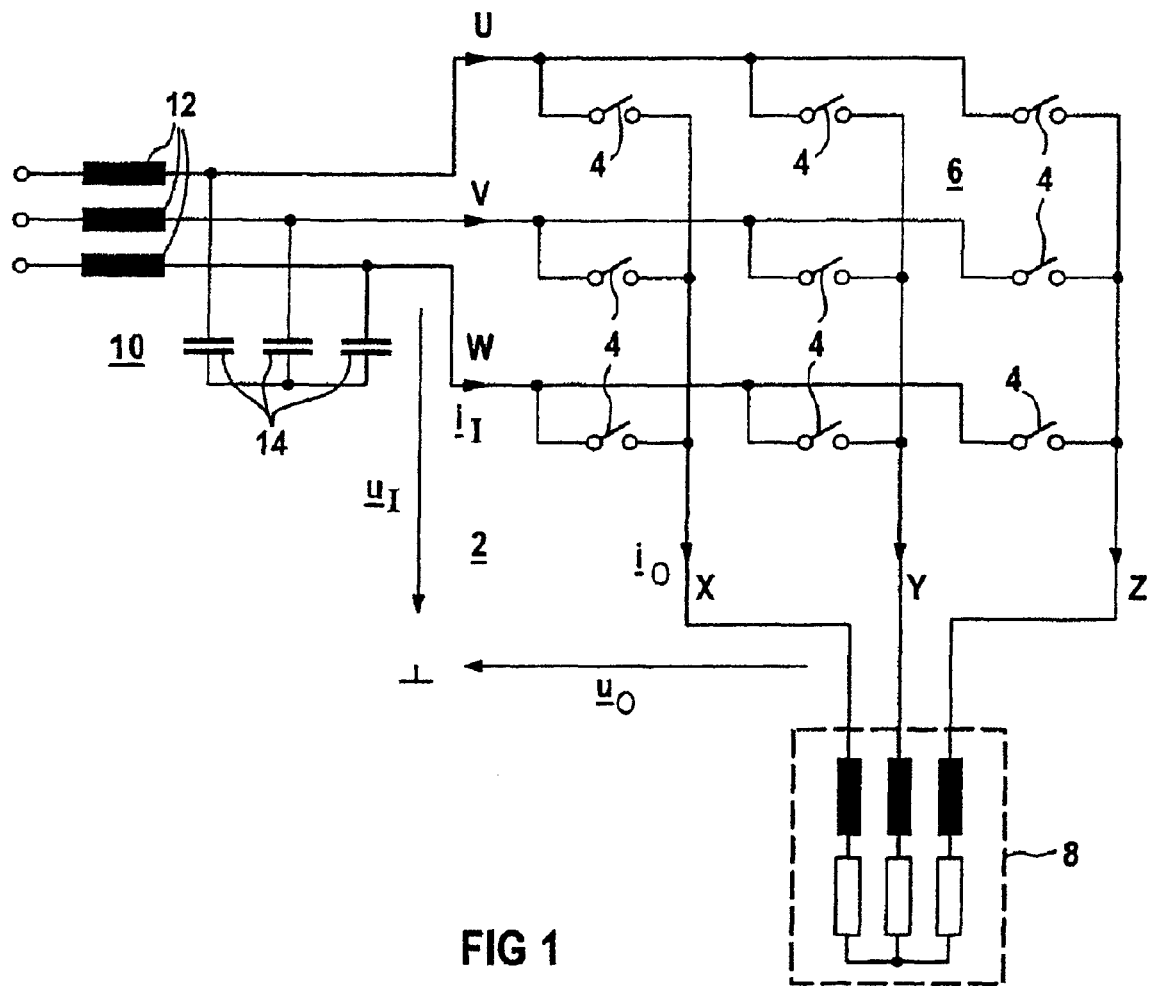
FIG. 1 shows an equivalent circuit of a matrix converter.
Figure 2:
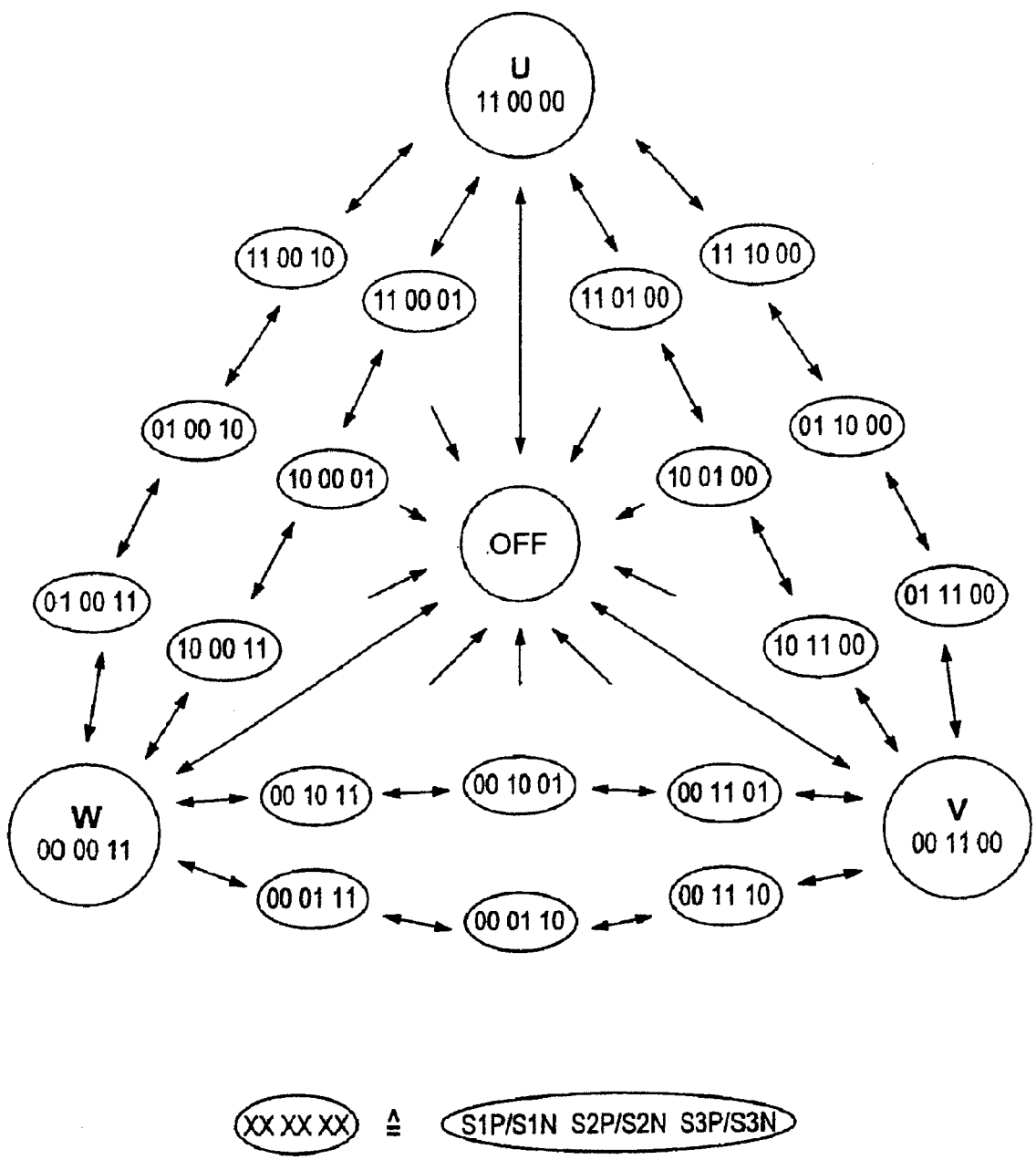
FIG. 2 shows all the possible commutation steps in this matrix converter.

Throughout all the Figures, same or corresponding elements are generally indicated by same reference numerals.

Turning now to the drawing, and in particular to FIG. 1, there is shown a an equivalent circuit of a three-phase matrix converter 2 in more detail. This three-phase matrix converter 2 has nine bidirectional power switches 4, which are arranged in a 3×3 switch matrix 6. The arrangement of the nine bidirectional power switches 4 in a 3×3 switch matrix 6 allows each output phase X, Y, Z to be connected to any desired input phase U, V, W. An inductive load 8 is connected to the output phases X, Y, Z of the matrix converter 2. The input phases U, V and W are linked to an LC filter 10, whose input side is connected to a network, which is not illustrated in any more detail. This LC filter 10 has inductances 12 and capacitors 14. In this case, these capacitors 14 are connected in star, although they can also be connected in delta. The inductances 12 are arranged in the supply lines to the capacitors 14, so that their charging currents are smoothed. One phase of this matrix converter 2 has three bidirectional power switches 4, which can connect one output phase X, Y or Z, respectively, to the input phases U, V and W. This matrix converter phase has a 3×1 switch matrix.

Figure 3:
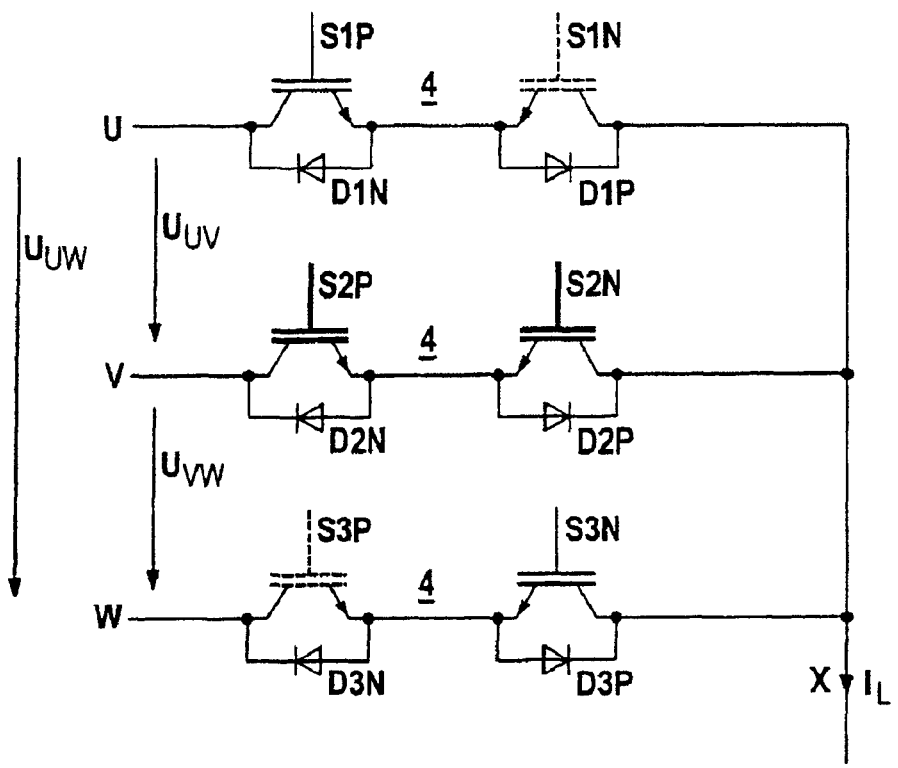
FIG. 3 shows one phase of a matrix converter with semiconductor switches in bidirectional power switches, which can be switched for commutation or freewheeling.

FIG. 3 shows one such phase of the matrix converter 2 in more detail. As can be seen from this FIG., each bidirectional power switch 4 has two back-to-back series-connected semiconductor switches S1P and S1N, each of which has a back-to-back diode D1N and D1P respectively connected in parallel with it. The illustrated semiconductor switches S1P, S1N; S2P, S2N and S3P, S3N are insulated gate bipolar transistors (IGBT). The back-to-back parallel-connected diodes D1P, D1N; D2P, D2N and D3P, D3N are each components of the associated IGBT module. Each semiconductor switch S1P, S1N; S2P, S2N and S3P, S3N in the bidirectional power switches 4 in one phase of the matrix converter 2 can be actuated individually and independently. A switch is referred to as having been switched on bidirectionally when both semiconductor switches S1P, S1N and S2P, S2N and S3P, S3N, respectively, in a bidirectional power switch 4 are switched on. If only one of the two semiconductor switches S1P, S1N and S2P, S2N and S3P, S3N, respectively, in a bidirectional power switch 4 is actuated, then this is referred to as a switch which is switched on unidirectionally.

If only one semiconductor switch in a bidirectional power switch 4 is closed, and no current flows in it owing to another bidirectional power switch 4 being closed to this phase, then this path is referred to as additional freewheeling. If this additionally switched path allows current to flow in the positive direction (positive current: network→load), then this is positive freewheeling. If the current can flow in the negative direction, then this is negative freewheeling. These switching states have no influence on normal operation. If the commutation-dependent semiconductor switches are switched off, the additional semiconductor switches have a positive effect, forming a freewheeling path for the load current. The energy which is stored in the load can be fed back into the feeding network.

On the assumption that all the voltages $U_{UV}$, $U_{VW}$ and $U_{WU}$ depicted in FIG. 3 are positive in the direction of the arrow and that the bidirectional power switch 4 in the phase V is closed bidirectionally, the following freewheeling options are obtained, based on the definition described above.

The semiconductor switch S1N may be switched on to provide negative freewheeling.

The semiconductor switch S3P may be switched on to provide positive freewheeling.

FIG. 3 shows the commutation-dependent semiconductor switches S2P and S2N represented by thick lines, and the freewheeling-dependent semiconductor switches S1N and S3P represented by dashed lines.

As long as the commutation-dependent semiconductor switches S2P, S2N are switched on, the load is electrically connected to the phase V via the bidirectional power switch 4. If the commutation-dependent semiconductor switches S2P, S2N are switched off, current can continue to flow through the freewheeling-dependent semiconductor switches S1N or S3P. If the load current is flowing from the network side to the load side (in the direction of the current arrow), then a further current path is formed via the positive freewheeling path S3P. If load current is flowing from the load to the network side (in the opposite direction to the current arrow), this allows a negative freewheeling path to be formed via the semiconductor switch S1N.

Figure 4:
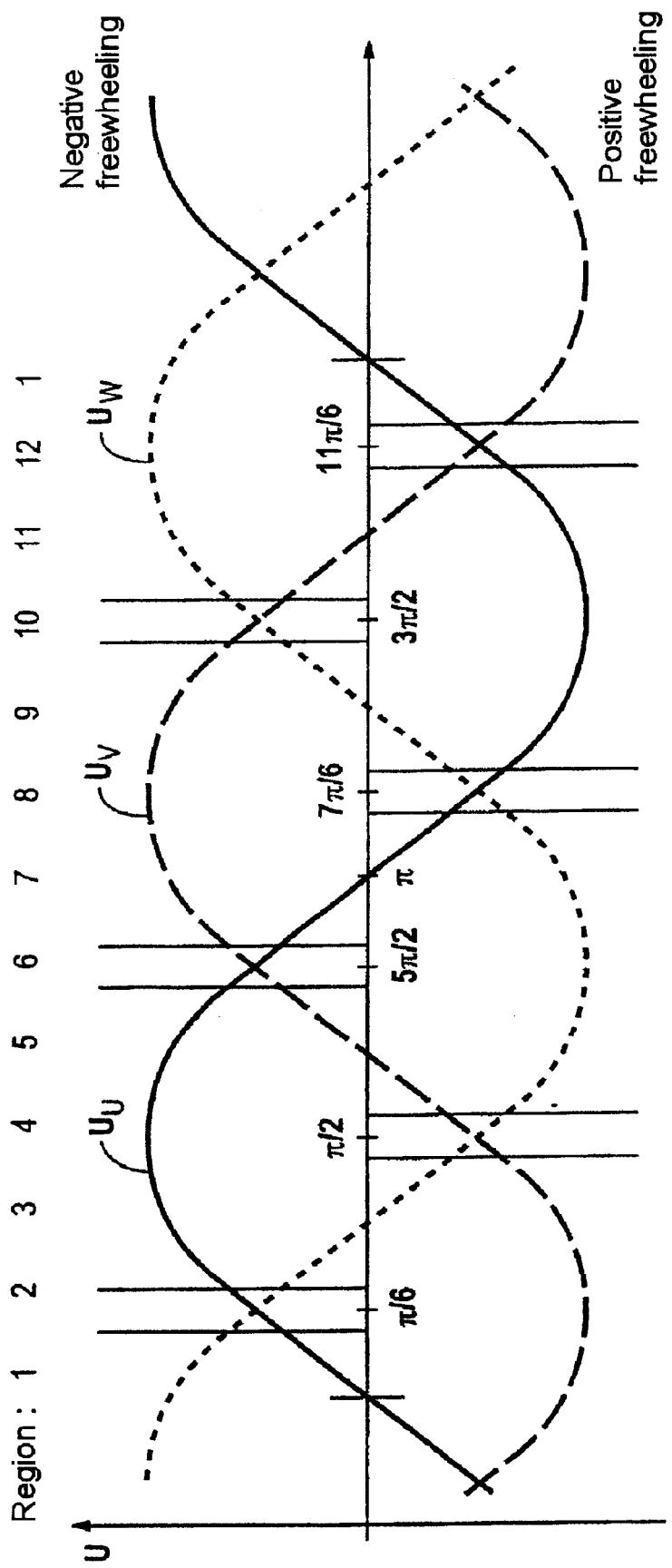
FIG. 4 shows the input voltages as a function of time t of a matrix converter.

The polarities of the phase-to-phase input voltage $U_{UV}$, $U_{VW}$ and $U_{WU}$ change during one network cycle. Different switches must be switched on as a freewheeling path. The switch S1N, S2N or S3N which can carry a negative current (negative freewheeling) is switched on in the respectively most positive input phase U, V or W. The switch S1P, S2P or S3P which can carry a positive current (positive freewheeling) is switched on in the most negative phase U, V or W. The following table shows the freewheeling-dependent switches as a function of the line voltages $U_U$, $U_V$ and $U_W$ that are shown in FIG. 4.

| Time | Most positive line voltage | Most negative line voltage | Negative free-wheeling | Positive free-wheeling |
|---|---|---|---|---|
| 0 to π/6 | $U_W$ | $U_V$ | S3N | S2P |
| π/6 to π/2 | $U_U$ | $U_V$ | S1N | S2P |
| π/2 to 5π/6 | $U_U$ | $U_W$ | S1N | S3P |
| 5π/6 to 7π/6 | $U_V$ | $U_W$ | S2N | S3P |
| 7π/6 to 3π/2 | $U_V$ | $U_U$ | S2N | S1P |
| 3π/6 to 11π/6 | $U_W$ | $U_U$ | S3N | S1P |
| 11π/6 to 2π | $U_W$ | $U_V$ | S3N | S2P |

According to this table, the most positive and the most negative line voltage $U_U$, $U_V$ and $U_W$ of the feeding network are in each case required in order to determine semiconductor switches which need to be switched as a function of freewheeling. In order to avoid an unnecessary increase in the complexity for the instrumentation and the detection of the voltage polarities, this complexity is intended to be reduced to an acceptable level. In order to allow the line voltages to be measured directly, it would be necessary to form a synthetic star point. A phase-to-phase voltage is used for voltage-oriented commutation methods. A phase-to-phase voltage can be measured relatively easily and reliably. Three measurements are required.

There are two methods which allow the largest and smallest line voltages to be determined from the measured phase-to-phase input voltages of the matrix converter. In the first method, the magnitude of the largest phase-to-phase voltage and the polarities of the three phase-to-phase voltages are used as input information. This information and a selection matrix are used to obtain the most positive and the most negative line voltage. If the polarity of the largest phase-to-phase voltage $U_{UV}$ is positive, then the line voltage $U_U$ is the most positive, and the line voltage $U_V$ is the most negative line voltage. However, if the polarity is negative, then the line voltage $U_U$ is the most negative, and the line voltage $U_V$ is the most positive line voltage.

In a second method, only the polarities of the three measured phase-to-phase voltages are used as input information. The following table is stored in order to determine the most positive and the most negative power voltage from this input information:

| VZ $U_{UV}$ | VZ $U_{VW}$ | VZ $U_{WU}$ | Smallest voltage | Largest voltage |
|---|---|---|---|---|
| − | + | + | $U_U$ | $U_V$ |
| + | − | − | $U_V$ | $U_U$ |
| + | − | + | $U_V$ | $U_W$ |
| − | + | − | $U_W$ | $U_V$ |
| + | + | − | $U_W$ | $U_U$ |
| − | − | + | $U_U$ | $U_W$ |

Since the second method requires only the polarities of the measured phase-to-phase voltages as input signals, this method is a preferred embodiment for determining line voltages.

Figure 5:
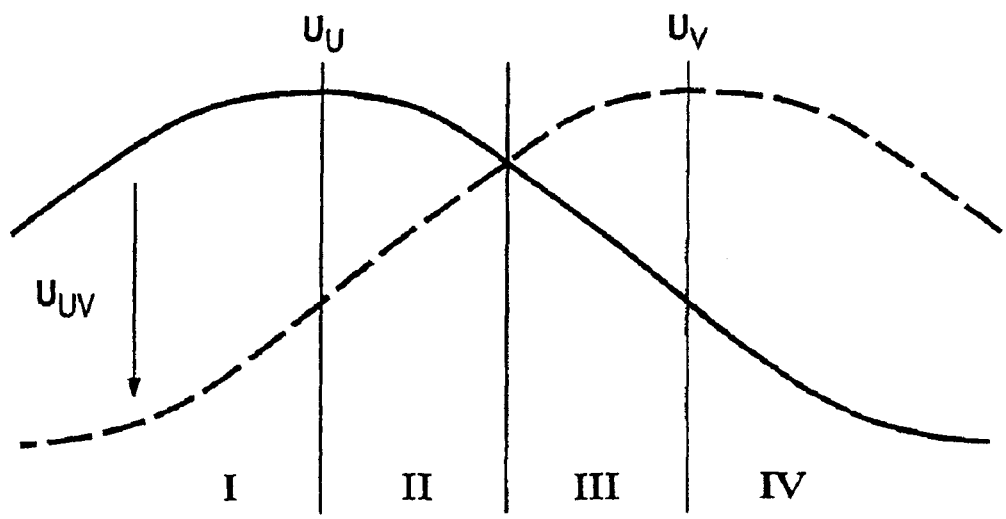
FIG. 5 shows a voltage zero crossing of a phase-to-phase input voltage in more detail.

FIG. 5 shows a detail from the diagram in FIG. 4 in more detail, in which the voltages $U_U$ and $U_V$ in each case intercept with a positive polarity. The phase-to-phase voltage $U_{UV}$ tends to zero in the region of the intersection. In the sections which are annotated I and IV, the polarity of the phase-to-phase voltage $U_{UV}$ can be detected accurately by the instrumentation. In the section I, the semiconductor switch S1N is switched to produce a negative freewheeling path, with the semiconductor switch S2N being switched to produce a negative freewheeling path in the section IV. The phase-to-phase voltage $U_{UV}$ is very low in the sections II and III. Correct detection of the polarity is difficult. On the assumption that the polarity has been detected correctly, the following switches are switched on in accordance with the abovementioned table:

Section II: S1N
Section III: S2N

In this switch position, there are no problems relating to freewheeling-dependent short circuits. If, the polarity of the phase-to-phase voltage $U_{UV}$ is measured incorrectly in these sections II and III, then the following semiconductor switches are switched on as the freewheeling path.

Section II: S2N
Section III: SIN

If the bidirectional power switch 4 that is formed from the semiconductor switches S1P and S1N is switched on in the section II, then this can lead to short circuits of the input phases through the freewheeling-dependent and commutation-dependent semiconductor switches.

Figure 6:
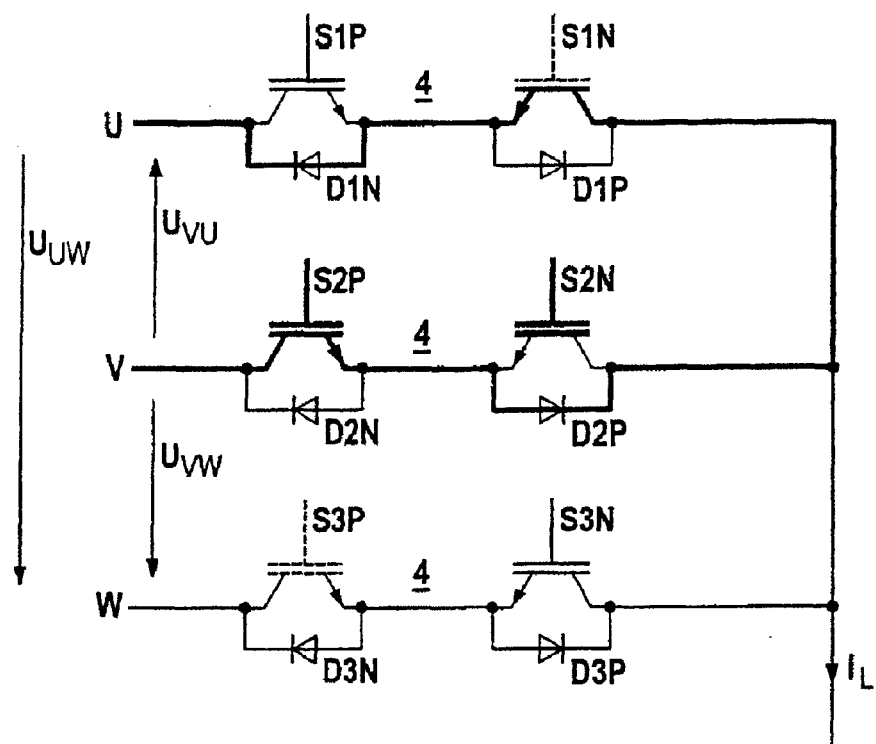
FIG. 6 shows one phase of a matrix converter with a short circuit caused by freewheeling.

If the commutation-dependent semiconductor switches are also still switched on, in addition to the freewheeling-dependent semiconductor switches, for example in the steady-state case of the phase V, then this leads to the switch positions shown in FIG. 6. The semiconductor switches S2P, S2N are switched on as a function of commutation. In the case of the phase-to-phase voltage $U_{VU}$, which is shown as being positive, the semiconductor switch S2N would need to be switched to provide a freewheeling path. However, if the voltage were measured incorrectly, the semiconductor switch S1N would be switched to provide a freewheeling path. The phases U and V are connected to one another via the commutation-dependent semiconductor switch S2P and the freewheeling-dependent semiconductor switch S1N, resulting in a short-circuit current as a function of freewheeling. The voltage driving the short-circuit current is very small. Owing to the incorrect measurements of the input voltage, the short circuit can last for a relatively long time. The short circuit is cancelled out if the phase-to-phase voltages $U_{VU}$ are larger, since the voltage detection process will then give correct results once again.

In terms of the load on the components, short circuits such as these should be avoided. For this reason, the freewheeling method according to the invention is modified such that the freewheeling method according to the invention operates reliably even when the phase-to-phase voltage is small. This modified freewheeling method according to the invention is used only in the region of the zero crossings of the phase-to-phase voltages. Additional paths are switched on once again even in this modified method. If one phase-to-phase voltage is in the range+/−several volts, then two unidirectional power switches 4 are connected directly to this phase-to-phase voltage. One bidirectional power switch 4 is connected to the phase-to-phase voltages which are not in the range of +/−several volts.

Freewheeling paths are proposed as a function of the nature of the zero-crossing region (positive/negative). If the zero-crossing region occurs at a negative line voltage, then the two positive paths of those bidirectional power switches 4 in the matrix converter 2 which are connected to these voltages are proposed. Otherwise, the zero-crossing region occurs at a positive line voltage, as a result of which the negative paths of the bidirectional power switches 4 that are involved are proposed.

A second condition is used to check which of the proposed paths from the first condition should be switched on just by the commutation control. If this is the case for one or both of the proposed paths, that is to say the paths are satisfied for both conditions, then these are switched on as freewheeling paths. One exception in this case is the situation in which neither of the two possible paths should be switched on by the commutation control. In this case, both proposed paths are switched on from the abovementioned first condition.

The following table shows how the freewheeling-dependent semiconductor switches are selected on the basis of the two described conditions.

| 1 st condition Proposed switches | | 2nd condition Switch by triggering equipment | | Switched freewheeling paths | |
|---|---|---|---|---|---|
| SI | SII | SI |     | SI |     |
| SI | SII |     | SII |    | SII |
| SI | SII | SI  | SII | SI | SII |
| SI | SII |   none  |  | SI | SII |

The advantage of the modified method according to the invention for controlling positive and negative freewheeling paths is that no additional voltage-dependent semiconductor switches are switched on. The determination of the semiconductor switches for the first condition is very reliable. No additional measurements are required for the second condition. The commutation logic data is used, and the other paths which are switched on are those which need to be switched on anyway as a function of the commutation. The freewheeling-dependent semiconductor switches cannot cause any short circuits.

One exception in this case is the situation where both the proposed (based on the first condition) paths are switched on, even though no commutation-dependent path is switched in the zero-crossing region. Short circuits cannot occur in this case either, since the second semiconductor switch which is necessary for a network-side short circuit, is dependent and is oriented in the direction of the voltage applied to the commutation group is not in this danger region.

With this method, there is no longer any risk of short circuits, even if the voltage polarities are determined incorrectly.

Figure 7:
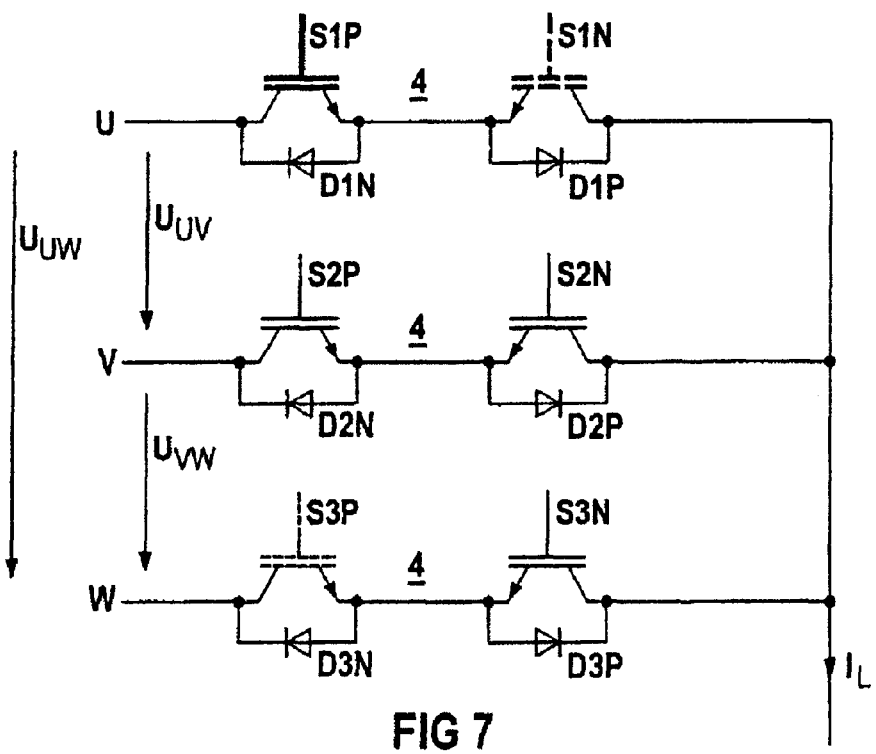
FIG. 7 shows one phase of a matrix converter without a short circuit caused by freewheeling.

FIG. 7 shows one phase of the matrix converter 2 as shown in FIG. 1, in which the freewheeling paths are determined on the basis of the modified freewheeling method according to the invention. The following states are assumed:

steady-state phase U→semiconductor switches S1P, S1N are switched on polarity of the phase-to-phase voltage $U_{UV}$ positive, the phase-to-phase voltage $U_{UV}$ is in the range+/−10 V polarity of the phase-to-phase voltage $U_{VW}$ is positive polarity of the phase-to-phase voltage $U_{WU}$ is positive From these initial conditions, it follows that the bidirectional power switch 4 which is connected to the line voltage $U_W$ is not in the range+/−10 V of the phase-to-phase voltage. The relevant semiconductor switches are S3P and S3N. Since the line voltage $U_W$ is negative, the semiconductor switch S3P is switched on the basis of the conditions of the freewheeling method according to the invention.

The two conditions which have been mentioned must be satisfied for the zero-crossing region.

First Condition

The semiconductor switches which are relevant around this zero crossing are S1P, S1N and S2P, S2N. The line voltages $U_U$ and $U_V$ are positive. Negative freewheeling paths are therefore required. These negative freewheeling paths can be switched by the semiconductor switches S1N and S2N. However, the second condition must also be satisfied in order to carry out a switching holding.

Second Condition

The semiconductor switches S1P and S1N are switched on via the commutation control. The semiconductor switches S1N and S2N are proposed in the first condition. It now follows from the first and second conditions that the semiconductor switch S1N can also be switched on. The semiconductor switch S1P is thus switched on as a function of the commutation while, in contrast, the semiconductor switch S1N is switched on as a function of the commutation and freewheeling, and the semiconductor switch S3P is switched on as a function of the freewheeling.

In order to make it possible to change between the simple freewheeling method and the modified freewheeling method according to the invention, the respective conditions must be defined. Regions are defined in which the network-side phase-to-phase voltages are at the zero crossing (modified freewheeling method), and those at which none of the phase-to-phase voltages is in the zero-crossing region (simple freewheeling method). A zero-crossing region occurs whenever one of the phase-to-phase voltages is in the range from −10V to +10V. The regions 2, 6, 10 in FIG. 4 are positive zero-crossing regions. The regions 4, 8 and 12 in this FIG. 4 are negative zero-crossing regions. If none of the phase-to-phase voltages are within these regions, then the matrix converter is in the "outside the zero crossings" mode. The corresponding regions are denoted by the numbers 1, 3, 5, 7, 9 and 11 in FIG. 4.

With regard to the decision as to whether special switching operations must be carried out on the basis of a zero crossing, it is initially irrelevant which of the phase-to-phase voltages is at a zero crossing. The only critical feature is that there is a zero crossing in one of the three input voltages. During one network cycle, each phase-to-phase voltage is located once in the positive zero-crossing region and once in the negative zero-crossing region. Three phase-to-phase input voltages result in a total of six regions per cycle which have a related zero-crossing region.

The change between the conditions for the additional semiconductor switches takes place at the start and at the end of the +/−10 V regions. Switching takes place between the simple freewheeling method according to the invention and the modified freewheeling method according to the invention. As during a commutation process, care must be taken during such a state change to ensure that there is no interruption in the current path. The new semiconductor switch must be switched on before the old semiconductor switch is switched off. During the change between the methods, there must be an overlap between the two methods, in order that the freewheeling path is not interrupted in any circumstances. In order to allow the overlap, the modified freewheeling method is activated immediately on reaching a +/−10 V region. Those semiconductor switches which were previously active likewise still remain switched on for a predetermined time. Both methods are active during this time period, and one freewheeling path is always connected. Once the overlap time has elapsed, the simple freewheeling method can be deactivated. The modified freewheeling method is now fully functional. Based on the same principle, on leaving a +/−10 V region, the semiconductor switches for this region still remain active for an adjustable time, while the semiconductor switches for the area outside this region are activated immediately.

Figure 8:
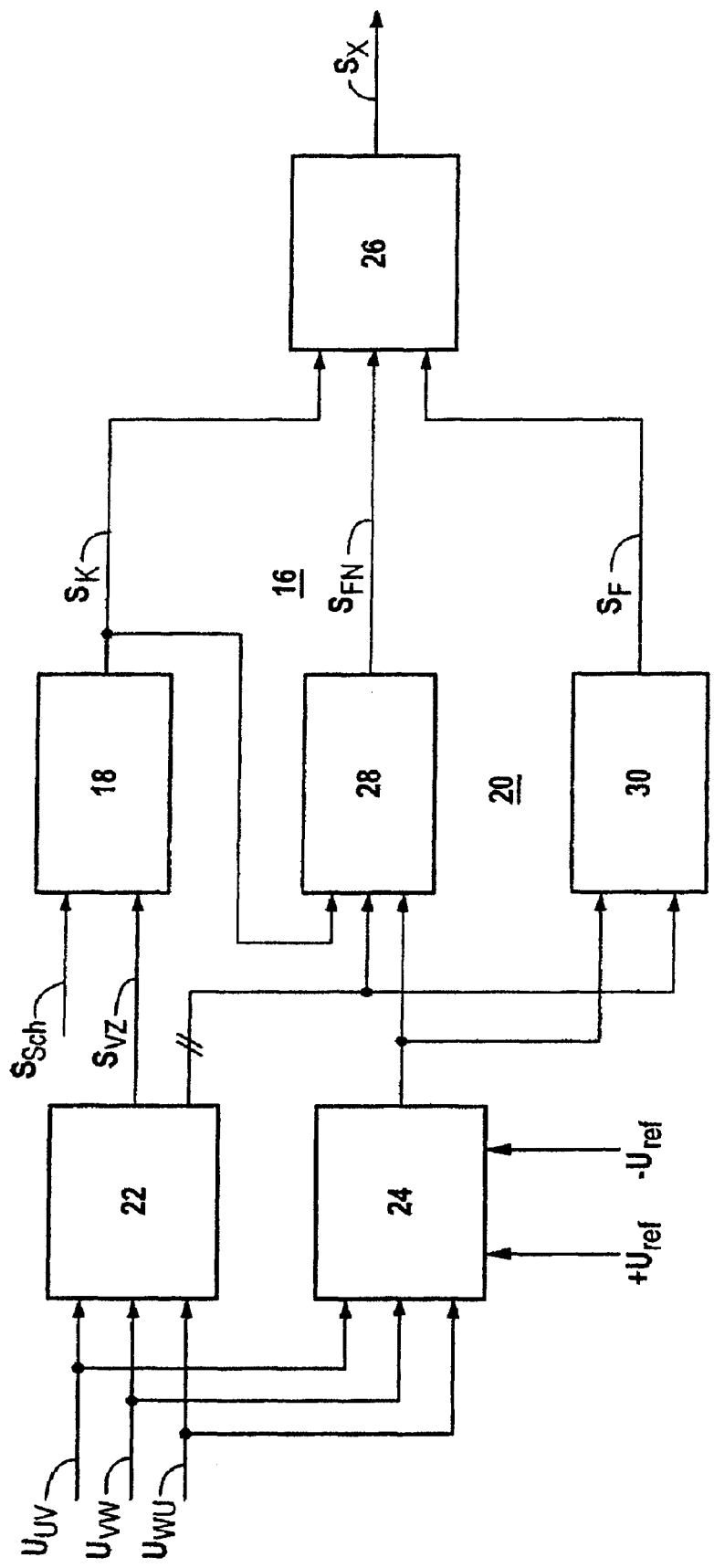
FIG. 8 shows a block diagram of a commutation and freewheeling control process for one matrix converter phase.

FIG. 8 shows a block diagram for a commutation and freewheeling control system 16 for a matrix converter phase X. This control system 16 has a commutation controller 18, an advantageous freewheeling controller 20, a device 22 for determining a most negative and a most positive line voltage, a device 24 for determining zero crossings of phase-to-phase voltages $U_{UV}$, $U_{VW}$ and $U_{WU}$ and an OR gate 26.

The advantageous freewheeling controller 20 is subdivided into a device 28 and 30 for determining freewheeling paths within and away from zero crossings of phase-to-phase voltages $U_{UV}$, $U_{VW}$ and $U_{WU}$.

The measured phase-to-phase voltages $U_{UV}$, $U_{VW}$ and $U_{WU}$ of the matrix converter 2 are each applied to the devices 22 and 24. The device 22 uses these measured phase-to-phase voltages $U_{UV}$, $U_{VW}$ and $U_{WU}$ to determine a respective most negative and most positive line voltage $U_U$, $U_V$ and $U_W$. One preferred embodiment of this device 22 has a table which in each case shows the association between the polarities of the measured phase-to-phase voltages $U_{UV}$, $U_{VW}$ and $U_{WU}$ and the most negative and most positive line voltages $U_U$, $U_V$ and $U_W$. These two determined line voltages are supplied to the two devices 28 and 30 for determining freewheeling paths. The commutation controller 18 receives from the device 22 a polarity signal $S_{VZ}$ for the measured phase-to-phase voltages $U_{UV}$, $U_{VW}$ and $U_{WU}$, and receives a nominal switching state signal $S_{Sch}$ from higher-level triggering equipment. The device 24 for determining zero crossings in the measured, phase-to-phase voltages $U_{UV}$, $U_{VW}$ and $U_{WU}$ is in each case linked on the output side to one input of the devices 28 and 30. The measured, phase-to-phase voltages $U_{UV}$, $U_{VW}$ and $U_{WU}$ of the matrix converter 2 are applied to the input side of the device 24. A positive and a negative reference voltage $+U_{ref}$ and $-U_{ref}$, respectively, are applied to two further inputs of this device 24. These two reference voltage values $+U_{ref}$ and $-U_{ref}$ have a magnitude, for example, of 10 V.

The device 28 for determining freewheeling paths within zero crossings of the phase-to-phase voltages $U_{UV}$, $U_{VW}$ and $U_{WU}$ is also linked on the input side to an output of the commutation controller 18. The OR gate 26, which is arranged on the output side, is in each case connected on the input side to an output of the commutation controller 18 and to the devices 28 and 30 of the preferred freewheeling controller 20. The switching signals $S_X$ of the semiconductor switches S1P, S1N, S2P, S2N and S3P, S3N for the phase X of the matrix converter 2 are produced at the output of this OR gate 26. A commutation and freewheeling controller 16 is likewise provided in each case for generating switching signals $S_Y$ and $S_Z$.

This commutation and freewheeling controller 16 which has been described is implemented in a programmable logic module.

The commutation controller 18 decides which semiconductor switches S1P, S1N, S2P, S2N or S3P, S3N in the bidirectional power switches 4 for the respective phases X, Y and Z of the matrix converter 2 must be switched on for normal operation of the matrix converter 2. Normal operation results in the desired output voltages $U_X$, $U_Y$, $U_Z$ of the matrix converter 2 being produced. The nominal state signal $S_{Sch}$ is used here as an input variable and indicates which input phase U, V, W the respective output phase X, Y or Z of the matrix converter 2 is intended to be connected to. The signal $S_{Sch}$ for one matrix converter phase is generated, for example, by means of a pulse-width modulator in higher-level triggering equipment. Furthermore, information is required about the polarity of the phase-to-phase voltages $U_{UV}$, $U_{VW}$ and $U_{WU}$, and this is supplied by means of the determined voltage polarity signal $S_{VZ}$.

The freewheeling paths in the matrix converter 2 are switched by the preferred freewheeling controller 20. The regions of the zero crossings of the measured, phase-to-phase voltages $U_{UV}$, $U_{VW}$ and $U_{WU}$ and the respective most negative and most positive line voltages are required for this purpose. Furthermore, the positive and the negative reference voltage values $+U_{ref}$ and $-U_{ref}$ are required for determining the regions of the zero crossings of the measured, phase-to-phase voltages $U_{UV}$, $U_{VW}$ and $U_{WU}$. In addition, the output signal $S_K$ from the commutation controller 18 is used, such that the information about the semiconductor switches S1P, S1N, S2P, S2N and S3P, S3N in the bidirectional power switches 4 for a respective phase X, Y or Z of the matrix converter 2, which are already intended to have been switched on the basis of the commutation controller 18.

The signal $S_K$ produced by the commutation controller 18 and the signals $S_{FN}$ and $S_F$ generated by the devices 28 and 30 in the preferred freewheeling controller 20 are logically linked by means of the OR gate 26, at whose output the respective control signal $S_X$, $S_Y$ or $S_Z$ is produced for the semiconductor switches S1P, S1N, S2P, S2N and S3P, S3N in the bidirectional power switches 4 for the respective phase X, Y or Z of the matrix converter 2.

Figure 9:
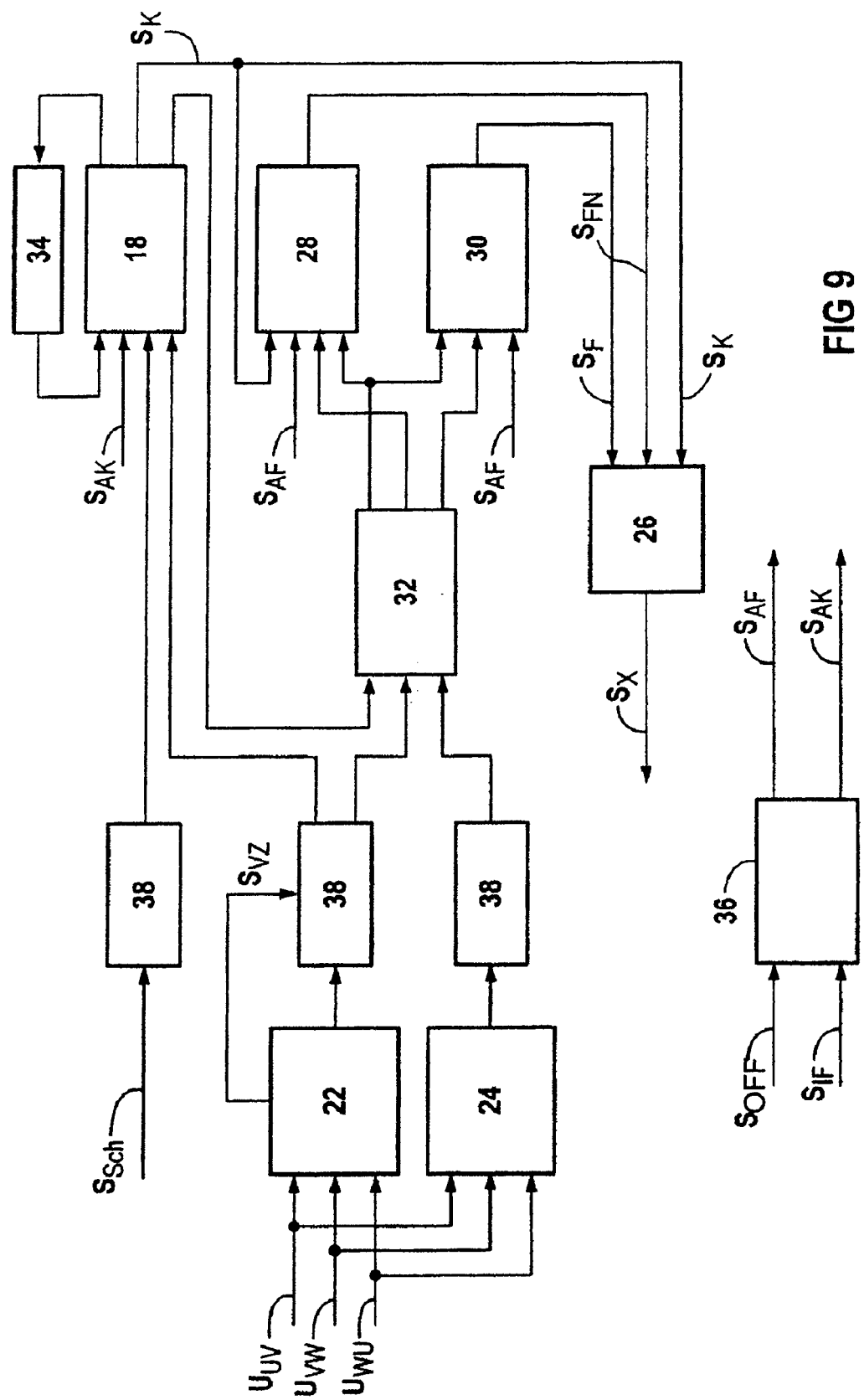
FIG. 9 shows a block diagram of one possible implementation of a commutation and freewheeling control for the matrix converter phase of FIG. 8.

FIG. 9 shows one possible implementation of the commutation and freewheeling controller 16 for one phase X, Y or Z of the matrix converter 2 as shown in FIG. 8, in more detail. This differs from the block diagram shown in FIG. 8 in that a signal enable 32, an interlocking device 34 and a switching-off controller 36 are provided. Furthermore, filters 38 are provided. The commutation controller 18 has a further output, at which a signal $S_{K1}$ is produced. This signal $S_{K1}$ indicates whether the matrix converter 2 is in a steady state. If commutation is taking place, then the matrix converter 2 is not in a steady state, so that the signal enable 32 is deactivated. The input signals for the signal enable 32 are thus no longer used for determining its output signals. The last valid output signals are emitted. When the commutation process ends, a steady state occurs once again and the signal enable 32 is active once again. The input signals which are applied at that time are once again used for determining the output signals.

The signal enable 32 is provided in order to exclude errors in the detection of measured values during a commutation process. Switching operations take place during a commutation process. These switching operations can lead to changes in the line voltages $U_U$, $U_V$ or $U_W$ (switching spikes, harmonics). These changes in the line voltages $U_U$, $U_V$ or $U_W$ may also be measured and can lead to corrupted measurement variables. In order to avoid further processing of these corrupted measurement variables, the measurement signals are "frozen" for the duration of a commutation process. Once the commutation process has ended, there are no more switching spikes, so that the measurement signals are passed on directly once again.

The matrix converter 2 is switched off by the switching-off controller 36. A distinction is drawn between controlled switching-off and emergency switching-off. In the case of emergency switching-off, the commutation-dependent and freewheeling-dependent semiconductor switches in the bidirectional power switches 4 of the matrix converter 2 are switched off simultaneously and immediately. There is a high probability of this switching-off process leading to overvoltages, which may result in destruction of the semiconductor switches in the bidirectional power switches 4 of the matrix converter 2. This emergency switching-off process should therefore be carried out only in a matrix converter which has an overvoltage protection device.

In the case of controlled switching-off, the commutation-dependent semiconductor switches in the bidirectional power switches 4 of the matrix converter 2 are switched off immediately by means of a switching-off signal $S_{AK}$. The load current can be decreased in a controlled manner by means of the switched freewheeling paths. There are therefore no overvoltages across the semiconductor switches. Once the current has decreased to zero, the freewheeling-dependent semiconductor switches in the bidirectional power switches 4 of the matrix converter 2 are likewise opened by means of a switching-off signal $S_{AF}$. This controlled switching-off process is initiated externally in the case of a switching-off signal $S_{OFF}$, in the case of switching off by means of a nominal switching state (1, 1, 1), in the event of errors in the detection of the polarity and in the event of errors in the detection of the zero crossings, which are in each case identified by a signal $S_{IF}$.

Overvoltages while switching off the matrix converter 2 are prevented by the preferred freewheeling controller 20 which, in addition to the commutation controller 18, produces switching-on commands for predetermined semiconductor switches in the bidirectional power switches 4 of the matrix converter 2. While switching off the commutation-dependent semiconductor switches in the bidirectional power switches 4 of the matrix converter 2, this preferred freewheeling controller 20 ensures that the current flowing out of the load flows continuously.

The parallelism of the commutation and freewheeling controllers 18 and 20 allows functional isolation between the semiconductor switches which are switched on for control purposes and of semiconductor switches which are switched on for converter protection. In the event of a fault or switching-off, the switching-off process can be carried out without any time delay, and without destroying the matrix converter 2. The freewheeling controller 20 is also robust with respect to voltage measurement errors, in particular at the zero crossing of the phase-to-phase voltages $U_{UV}$, $U_{VW}$ and $U_{WU}$.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for controlling a positive or negative freewheeling path in a phase of a matrix converter having nine bidirectional power switches arranged in a 3×3 switch matrix, with each power switch associated with a matrix converter phase and having two back-to-back series-connected semiconductor switches, comprising the steps of:
   a) identifying a bidirectional power switch of a matrix converter phase having a most negative line voltage;
   b) identifying a bidirectional power switch of a matrix converter phase having a most positive line voltage;
   c) actuating the semiconductor switch of the identified bidirectional power switch having the most negative line voltage to provide a positive freewheeling path capable of carrying a positive load current, and d) actuating the semiconductor switch of the identified bidirectional power switch having the most positive line voltage to provide a negative freewheeling path capable of carrying a negative load current.

2. The method of claim 1, and further comprising the steps of determining a polarity of a plurality of phase-to-phase input voltages of the matrix converter, and determining the most positive and the most negative line voltage based on the polarity of the phase-to-phase input voltages.

3. The method as claimed in claim 2, and further comprising the steps of determining the most positive and the most negative line voltage based on the polarity of the phase-to-phase input voltages by using a table.

4. A method for controlling a positive or negative freewheeling path in a phase of a matrix converter having nine bidirectional power switches arranged in a 3×3 switch matrix, with each power switch associated with a matrix converter phase and having two back-to-back series-connected semiconductor switches, comprising the steps of:

a) determining a phase-to-phase input voltage of at least two matrix converter phases;

b) determining one of a positive and a negative zero crossing of the phase-to-phase input voltage and the two bidirectional power switches associated with the zero crossing;

c) selecting from each of the two bidirectional power switches a semiconductor switch to provide corresponding positive and negative freewheeling paths in a region of the zero crossing;

d) actuating the selected semiconductor switch if the selected semiconductor switch is identical to a semiconductor switch determined with a commutation method, and e) actuating both selected semiconductor switches if none of the selected semiconductor switches is identical to a semiconductor switch determined with the commutation method.

5. The method of claim 4, and further comprising the steps of:

f) identifying a bidirectional power switch of a matrix converter phase having a most negative line voltage;

g) identifying a bidirectional power switch of a matrix converter phase having a most positive line voltage;

h) actuating the semiconductor switch of the identified bidirectional power switch having the most negative line voltage to provide a positive freewheeling path capable of carrying a positive load current, i) actuating the semiconductor switch of the identified bidirectional power switch having the most positive line voltage to provide a negative freewheeling path capable of carrying a negative load current, and k) when one of a positive and a negative zero crossing of the phase-to-phase input voltage is detected, immediately carrying out steps a) through e), while leaving the semiconductor switches actuated in steps f) through i) switched on for a predetermined time.

6. The method of claim 4, and further comprising the steps of determining an amplitude of a plurality of phase-to-phase input voltages of the matrix converter; comparing the amplitudes of the determined phase-to-phase input voltages with one of a positive and negative reference value; and generating a switching signal for a corresponding semiconductor switch when the amplitudes of the determined phase-to-phase input voltages undershoot the negative reference value or overrange the positive reference value.

* * * * *